United States Patent
Yee et al.

(10) Patent No.: US 9,183,226 B2
(45) Date of Patent: Nov. 10, 2015

(54) IMAGE CLASSIFICATION

(71) Applicant: Google Inc., Mountain View, CA (US)

(72) Inventors: Yangli Hector Yee, San Francisco, CA (US); Samy Bengio, Los Altos, CA (US); Charles J. Rosenberg, Cupertino, CA (US); Erik Murphy-Chutorian, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/336,692

(22) Filed: Jul. 21, 2014

(65) Prior Publication Data

US 2015/0161170 A1  Jun. 11, 2015

Related U.S. Application Data

(63) Continuation of application No. 13/910,493, filed on Jun. 5, 2013, now Pat. No. 8,787,683, which is a continuation of application No. 12/505,240, filed on Jul. 17, 2009, now Pat. No. 8,478,052.

(51) Int. Cl.
| | |
|---|---|
| *G06K 9/62* | (2006.01) |
| *G06K 9/46* | (2006.01) |
| *G06K 9/66* | (2006.01) |
| *G06K 9/54* | (2006.01) |
| *G06K 9/60* | (2006.01) |
| *G06F 17/30* | (2006.01) |

(52) U.S. Cl.
CPC .... *G06F 17/30253* (2013.01); *G06F 17/30244* (2013.01); *G06F 17/30864* (2013.01); *G06K 9/4676* (2013.01); *G06K 9/6256* (2013.01); *G06K 9/66* (2013.01); *G06K 2209/01* (2013.01)

(58) Field of Classification Search
None
See application file for complete search history.

(56) References Cited

U.S. PATENT DOCUMENTS

| | | |
|---|---|---|
| 5,983,237 A | 11/1999 | Jain |
| 7,111,002 B2 | 9/2006 | Zhang |
| 7,499,916 B2 | 3/2009 | Liu |

OTHER PUBLICATIONS

Carneiro et al., "Supervised Learning of Semantic Classes for Image Annotation and Retrieval", IEEE Transactions on Pattern Analysis and Machine Intelligence, vol. 29, No. 3, Mar. 2007, pp. 394-410.

(Continued)

*Primary Examiner* — Matthew Bella
*Assistant Examiner* — Jose M Torres
(74) *Attorney, Agent, or Firm* — Fish & Richardson P.C.

(57) ABSTRACT

An image classification system trains an image classification model to classify images relative to text appearing with the images. Training images are iteratively selected and classified by the image classification model according to feature vectors of the training images. An independent model is trained for unique n-grams of text. The image classification system obtains text appearing with an image and parses the text into candidate labels for the image. The image classification system determines whether an image classification model has been trained for the candidate labels. When an image classification model corresponding to a candidate label has been trained, the image classification subsystem classifies the image relative to the candidate label. The image is labeled based on candidate labels for which the image is classified as a positive image.

20 Claims, 6 Drawing Sheets

(56) References Cited

OTHER PUBLICATIONS

Tieu et al., "Boosting Image Retrieval", Proceedings of the IEEE Conference on Computer Vision and Pattern Recognition, vol. 1, 2000, pp. 228-235. Maji et al., "Classification using Intersection Kernal Support Vector Machines is Efficient." Retrieved from internet http://cs.berkeley.edu 2008.

Granger et al., "A Discriminative Kernal-based Model to Rank Images from Text Queries." Retrieved from internet http://chicago.edu 2008.

IMAGE CLASSIFICATION

CROSS-REFERENCE TO RELATED APPLICATION

This application is a continuation application of, and claims priority to, U.S. patent application Ser. No. 13/910,493, entitled IMAGE CLASSIFICATION, to inventors Yangli Hector Yee, Samy Bengio, Charles J. Rosenberg and Erik Murphy-Chutorian, which was filed on Jun. 5, 2013, which is a continuation and claims priority to U.S. patent application Ser. No. 12/505,240, entitled IMAGE CLASSIFICATION, to inventors Yangli Hector Yee, Samy Bengio, Charles J. Rosenberg and Erik Murphy-Chutorian, which was filed on Jul. 17, 2009. The disclosures of the foregoing applications are incorporated herein by reference in their entirety.

BACKGROUND

The present disclosure relates to digital information processing, and particularly to labeling images for information retrieval.

The Internet provides access to a wide variety of resources, for example, video or audio files, or Web pages including content for particular subjects, book articles, or news articles. A search system can select one or more resources in response to receiving a search query that includes one or more search terms or phrases. The search system selects and scores resources based on their relevance to the search query and on their importance relative to other resources to provide search results that link to the selected resources. The search results are typically ordered according to the scores.

The relevance of a resource to a search query can be determined based on text associated with the resource. The text associated with a resource includes text that appears in the resource, text that appears on a same Web page as the resource, and text metadata for the resource. For example, text associated with resources can be compared to a search query to determine measures of relevance for the resources relative to the search query. In turn, the resources are scored based on the comparisons and search results corresponding to the resources are ordered for presentation based on the scores.

Images are an example of resources that can be determined to be relevant to a search query based on text associated with the image. The relevance of an image to the search query can be determined, for example, based on text that appears within a specified proximity of the image. For example, an image that is presented on a Web page and within a specified proximity of the text "football" can be determined to be relevant to the queries "football," and/or "sports" and referenced in search results for these queries.

While text associated with an image can be used to compute the relevance of the image to a search query, it can sometimes be difficult to determine the relevance of individual words of the text that is associated with the image. For example, an image of a knife may be associated with the text "a wedding cake knife" Based solely on this text, it can be difficult to determine which of the terms "wedding," "cake," and "knife" is more relevant to the content of the image. Therefore, the image of the knife may be improperly identified as being a relevant image for the queries "cake" or "wedding cake" even though a cake does not appear in the image. Similarly, some text that is identified as being associated with the image based, for example, based on its proximity to the image, may be text that was included in the Web page to describe other content of the Web page (e.g., another image in the Web page).

SUMMARY

In general, one aspect of the subject matter described in this specification can be implemented in methods that include the actions obtaining a plurality of n-grams, each of the n-grams including a unique set of one or more terms; for each of the n-grams: identifying a plurality of training images for training an image classification model, the plurality of training images including positive training images having relevance measures, for the n-gram, that satisfy a relevance threshold and negative training images having relevance measures, for the n-gram, that do not satisfy the relevance threshold; selecting a training image from the plurality of training images; classifying the training image with the image classification model based on a feature vector of the training image, the feature vector comprising image feature values for the training image; and training the image classification model based on the feature vector of the training image and the classification of the training image. These and other embodiments of this aspect include corresponding systems, apparatus, and computer program products.

These and other embodiments can optionally include one or more of the following features. Training the image classification model can include the action computing scalars corresponding to feature vectors based on image feature values of classified training images. Training the image classification model can include the actions computing a classification score for the training image based on the image classification model; classifying the training image based on the classification score; determining that the training image is incorrectly classified; and computing a minimum kernel approximation based on the feature vector for the training image. Identifying the plurality of training images can include the actions identifying, as a positive training image, an image having at least a threshold selection rate when referenced in search results for the n-gram.

Another aspect of the subject matter described in this specification can be implemented in methods that include the actions obtaining text associated with an image; obtaining a feature vector for the image; parsing, in a processing device, the text into candidate labels, each candidate label being a unique n-gram of the text; determining, in the processing device, that an image classification model is trained for an n-gram matching one or more candidate labels; and classifying, in the processing device, the image to the one or more candidate labels based on the feature vector and the image classification model for the n-gram matching the one or more candidate labels. This and other embodiments of this aspect include corresponding system, apparatus, and computer program products.

These and other embodiments can optionally include one or more of the following features. The determining and classifying can be performed for each candidate label. Classifying the image can include the actions computing a classification score for the image to the one or more candidate labels based on the feature vector and the image classification models for the n-gram matching the one or more candidate labels; and classifying the image to the one or more candidate labels based on the classification score. Classifying the image to the one or more candidate labels based on the classification score can include the actions determining that the image has a classification score to a particular candidate label that meets or exceeds a relevance threshold; and labeling the image with label corresponding to the particular candidate label.

Particular embodiments of the invention can be implemented to realize one or more of the following advantages. Relevance scores for text to images can be computed for each individual word associated with an image. Images are associated with high confidence labels corresponding to words having relevance scores that meet a relevance threshold. Relevance scores to a search query can be boosted for images that are associated with high confidence labels that match the search query.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
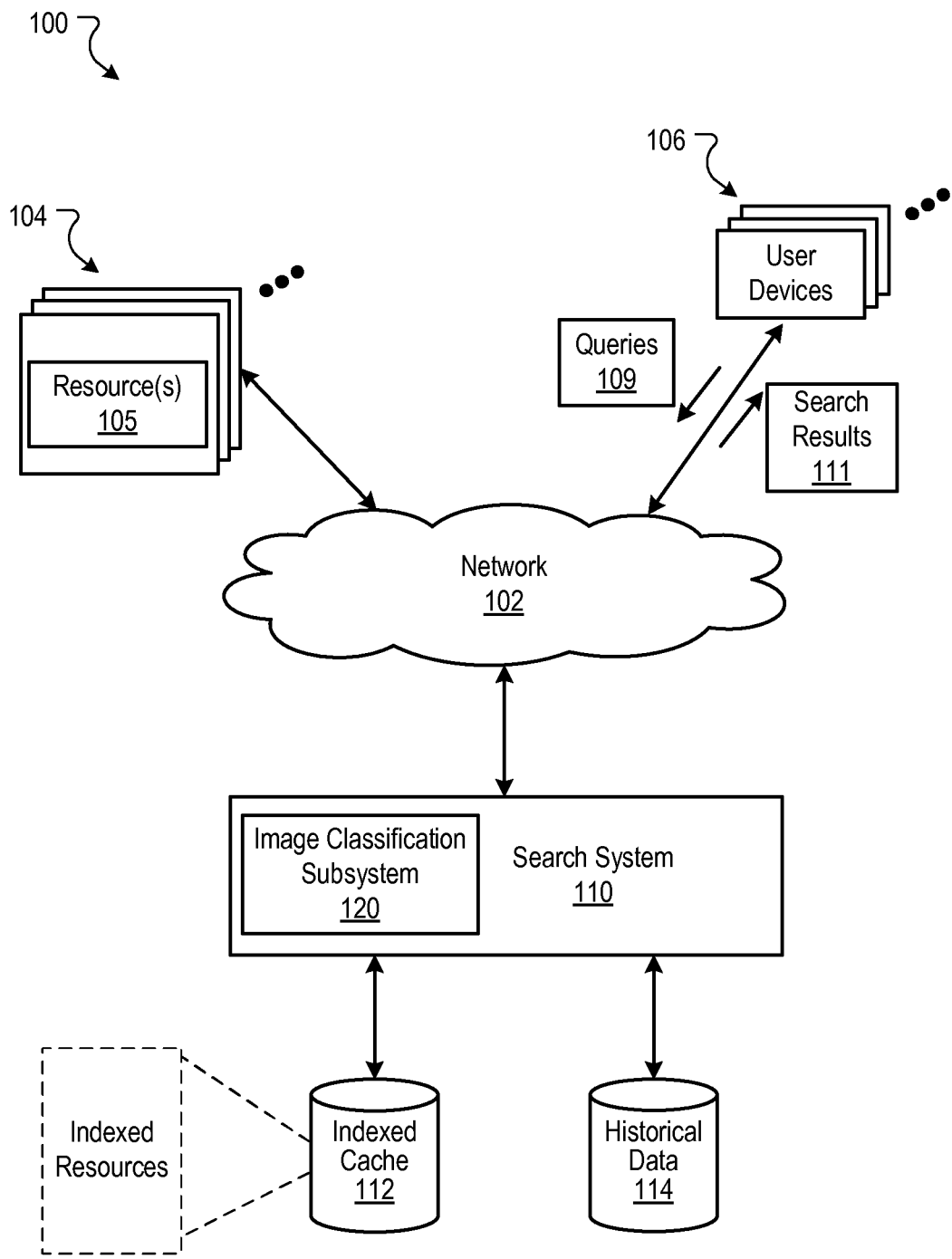
FIG. 1A is a block diagram of an example environment in which a search system provides search services.

FIG. 1A is a block diagram of an example environment 100 in which a search system 110 provides search services. The example environment 100 includes a network 102, e.g., a local area network (LAN), wide area network (WAN), the Internet, or a combination of them, connects web sites 104, user devices 106, and the search system 110. The environment 100 may include many thousands of publishers 104 and user devices 106.

A web site 104 is one or more resources 105 associated with a domain name and hosted by one or more servers. An example web site is a collection of Web pages formatted in hypertext markup language (HTML) that can contain text, images, multimedia content, and programming elements, e.g., scripts. Each web site 104 is maintained by a publisher, e.g., an entity that manages and/or owns the web site.

A resource 105 is any data that can be provided by a web site 104 over the network 102 and that is associated with a resource address. Resources 105 include HTML pages, word processing documents, and portable document format (PDF) documents, images, video, and feed sources, to name just a few. The resources 105 can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources 105 over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 105, the search system 110 identifies the resources 105 by crawling and indexing the resources 105 provided on web sites 104. Data about the resources 105 can be indexed based on the resource to which the data corresponds. The indexed and, optionally, cached copies of the resources 105 are stored in an indexed cache 112.

The user devices 106 submit search queries 109 to the search system 110. In response, the search system 110 accesses the indexed cache 112 to identify resources 105 that are relevant to the search query 109. The search system 110 identifies the resources 105 generates search results 111 that identify the resources 105 and returns the search results 111 to the user devices 106. A search result 111 is data generated by the search system 110 that identifies a resource 105 that is responsive to a particular search query, and includes a link to the resource 105. An example search result 111 can include a Web page title, a snippet of text or a portion of an image extracted from the Web page, and the URL of the Web page.

For a search directed to text, the search results are ranked based on scores related to the resources 105 identified by the search results 111, such as information retrieval ("IR") scores, and optionally a quality score of each resource relative to other resources. In some implementations, the IR scores are computed from dot products of feature vectors corresponding to a search query 109 and a resource 105, and the ranking of the search results is based on relevance scores that are a combination of the IR scores and page quality scores. The search results 111 are ordered according to these relevance scores and provided to the user device 106 according to the order.

For a search directed to images that uses a text query as input, the search system 110 can combine the relevance score of a resource with a relevance feedback score of an image embedded in the resource. An example relevance feedback score is a score derived from a selection rate (e.g., click-through-rate) of an image when that image is referenced in a search result for a query. These combined scores are then used to present search results directed to the images embedded in the resources 105.

The relevance scores for an image can be based on labels that are associated with the image. Labels are text or data flags that indicate a topic to which the image belongs. Labels can be explicitly associated with an image, for example, by the publisher that is providing the image. For example, a publisher can associate the text "football" with an image that includes content that is directed to football (e.g., an image of a football or a football player). Labels can also be explicitly associated with an image by users to whom the image is presented. For example, users can engage in activities, such as online games, in which the users provide text that describes the content of an image that is presented to the user. In turn, when a threshold portion of users have specified particular text as being descriptive of the image, the image can be labeled with the particular text.

Labels can also be associated with an image based on the relevance feedback for the image. For example, a label matching a query can be associated with an image when the image is selected for presentation by users with at least a threshold selection rate. The threshold selection rate can be specified as a portion of the total search results for the query in which the image is referenced. In turn, the label can then be used to select the image for reference in search results responsive to future instances of the query.

The relevance score for an image to a query can be based on how well an image label matches the query. For example, an image having a label that is the same as the query can have a higher relevance score to the query than an image having a label that is a root of the query or otherwise matches the query based on query expansion techniques (e.g., synonym identification or clustering techniques). Similarly, images having labels that match the query are identified as more relevant to the query than images that do not have labels matching the query. In turn, the images having labels that match the query may be selected for reference at higher search result positions in a search results page than images that do not match the query.

The user devices 106 receive the search results 111, e.g., in the form of one or more Web pages, and render the pages for presentation to users. In response to the user selecting a link in a search result at a user device 106, the user device 106 requests the resource 105 identified by the link. The web site 104 hosting the resource 105 receives the request for the resource from the user device 106 and provides the resource 105 to the requesting user device 106.

Search queries 109 submitted during user sessions are stored in a data store such as the historical data store 114. Selection data specifying actions taken in response to search results provided are also stored in a data store such as the historical data store 114. These actions can include whether a search result was selected. The data stored in the historical data store 114 can be used to map search queries 109 submitted during search sessions to resources 105 that were identified in search results 111 and the actions taken by users.

The search system 110 includes an image classification subsystem 120 to identify relevant text for labels for images and/or associate one or more labels corresponding to the relevant text with the images. The relevant text can be text that appears on a Web page with the image, or text that is otherwise associated with the image, as described below.

Relevant text can be identified for an image using an image classification model that generates a relevance score for the image to the text. The text can be any n-gram of text. For example, a single word can be identified as relevant to an image or a string of 10 words can be identified as a textual unit that is relevant to the image. A textual unit is one or more words that define a set of text.

Each unique set of text can have a corresponding unique image classification model for computing a measure of relevance of images to the text. For example, a separate image classification model can be trained for each of the terms "dolphin," "exhibit," as well as the phrase "dolphin exhibit." When the image classification subsystem 120 identifies textual unit that is associated with an image, the image classification model corresponding to the identified textual unit can be used to compute a relevance score for the image to the textual unit. However, before the image classification models can be used, they must first be trained by the image classification subsystem 120.

Figure 1B:
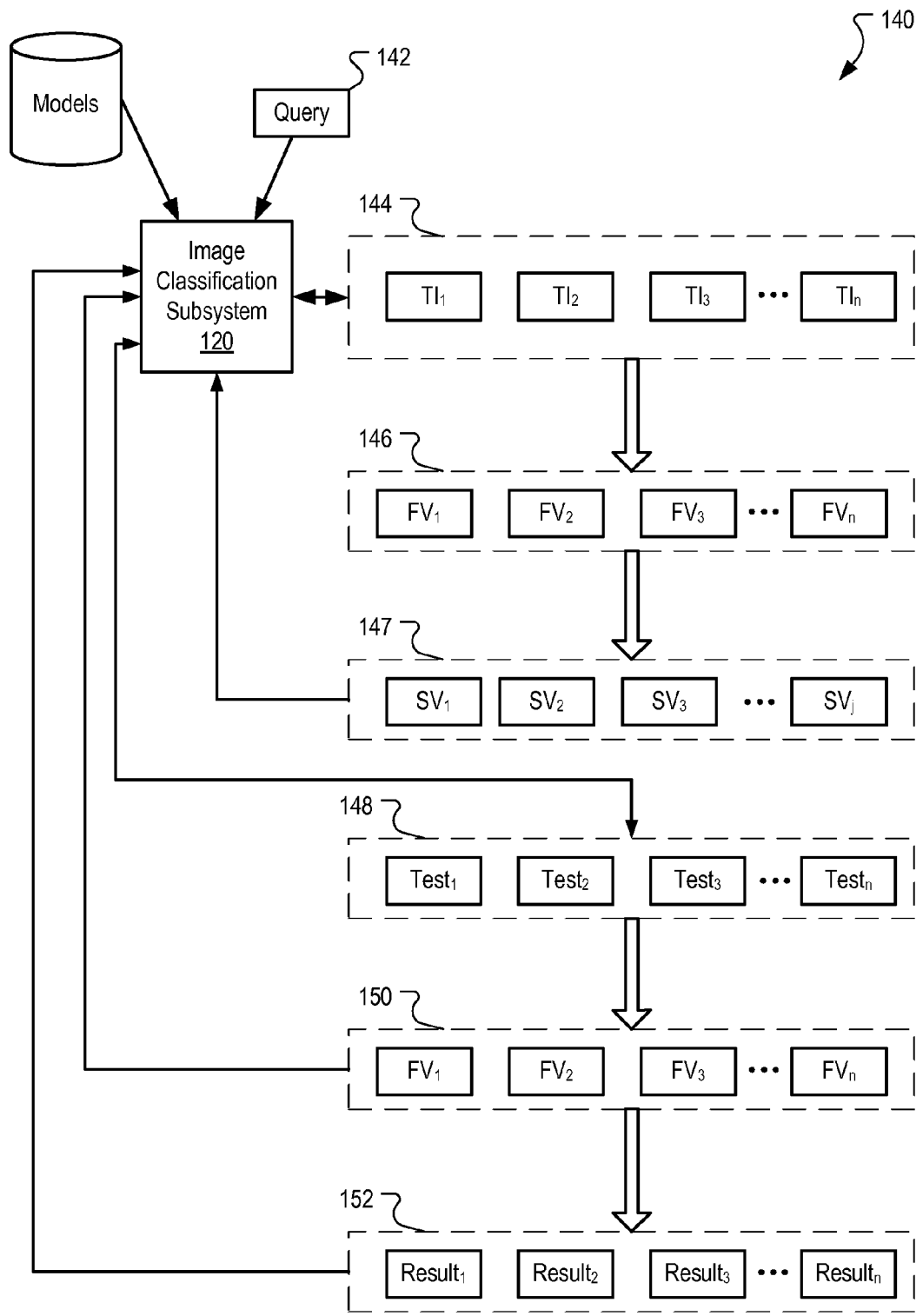
FIG. 1B is a block diagram of an example process flow for training an image classification model in an image classification subsystem.

FIG. 1B is a block diagram of an example process flow 140 for training an image classification model in an image classification subsystem 120. The image classification subsystem 120 obtains a query 142 as an input. The image classification subsystem 120 can obtain the query, for example, from a data store storing queries that were previously submitted by user devices, such as the query log 114 of FIG. 1A.

The image classification subsystem 120 identifies images that are relevant to the query ("positive images") and images that are not relevant to the query ("negative images") as training images $TI_1$-$TI_n$ for a query classification model. The positive images are images having relevance measures to the query that meet or exceed a relevance threshold, while negative images are images having relevance measures that do not meet or exceed the relevance threshold, as described in more detail with reference to FIG. 2. The training images $TI_1$-$TI_n$ define a set of training images 144 that will be used to train the image classification model.

The image classification system 120 obtains image feature values for each training image $TI_1$-$TI_n$. Image feature values represent visual characteristics of images. For example, image feature values can specify a value representing a color, texture, and/or other characteristics of an image. The image classification system 120 can compute the image feature values for the training images $TI_1$-$TI_n$ by analyzing the data defining the images, as described below in reference to FIG. 2. The image classification system 120 can represent the image feature values of each of the training images $TI_1$-$TI_n$ as feature vectors $FV_1$-$FV_n$ that correspond to each of the training images $TI_1$-$TI_n$. The feature vectors $FV_1$-$FV_n$ define a set of feature vectors 146 that represent the set of training images 144.

The image classification subsystem 120 selects one of feature vectors (e.g., $FV_1$) from the set of feature vectors 146. The feature vector can be semi-randomly selected from the set of feature vectors 146. The semi-random selection can be subject to a selection requirement specifying that a feature vector representing a negative image be selected with a threshold likelihood, as described in more detail below with reference to FIG. 2.

The image classification subsystem 120 classifies the training image corresponding to the selected feature vector using the selected feature vector as an input to the image classification model. The output of the image classification model is a classification score that indicates whether the image is classified as a positive image for the query or a negative image for the query. The classification score is a measure relevance of the image to the query. The manner in which the classification score is computed is described with reference to FIG. 2.

When the output of the image classification model accurately classifies a training image (e.g., correctly identifies a positive training image as such or a negative training image as such), the image classification subsystem 120 selects another feature vector (e.g., $FV_2$) and classifies the corresponding training image (e.g., $TI_2$) using the image classification model.

When the output of the image classification model inaccurately classifies a training image (e.g., incorrectly identifies a negative image as a positive image or identifies a positive image as a negative image) the image classification model defines a support vector (e.g., $SV_1$) for the image classification model based on the feature vector of the inaccurately classified image. The support vector is then used to adjust the image classification model, as described with reference to FIG. 2.

The image classification system 120 iteratively classifies training images based on the support vectors to train the image classification model. Once support vectors have been identified for the image classification model, subsequent iterations classify the training images based on the feature vectors of the training images and the support vectors (i.e., a set of identified support vectors) of the image classification model. When additional training images are incorrectly classified in subsequent iterations, the support vectors 147 for the image classification model are updated based on the feature vectors of the incorrectly classified training images. The image classification model is iteratively adjusted based on the updated support vectors 147 until a stop condition is satisfied. The stop condition can be, for example, N training iterations having been completed.

Once the stop condition has been satisfied, the image classification subsystem 120 measures the accuracy of the image classification model using a set of test images 148. The set of test images 148 include positive images and negative images for the query that were not included in the set of training images 144. The image classification subsystem 120 obtains feature vectors for the set of test images 148 in a manner similar to which the feature vectors are obtained for the set of training images 144. The feature vectors for the test images define a set of test feature vectors 150. The image classification subsystem 120 iteratively selects a feature vector from the set of test feature vectors 150 and computes a result for the corresponding image based on the feature vector and the updated support vectors 147. The results from the image classification model define a set of results 152.

The image classification subsystem 120 uses the set of results 152 to calculate an error rate for the image classification model. The error rate is calculated, for example, based on a portion of test images that are incorrectly classified. When the error rate or the change in error rate from one or more previous iterations meets or exceeds a threshold error rate, the image classification subsystem 120 continues the iterative training process with additional images from the set of training images 144. When the error rate or a change in the error rate is lower than the threshold error rate, the image classification model for the query is defined as trained and the image classification subsystem 120 can use the image classification model to classify and/or label images.

Figure 1C:
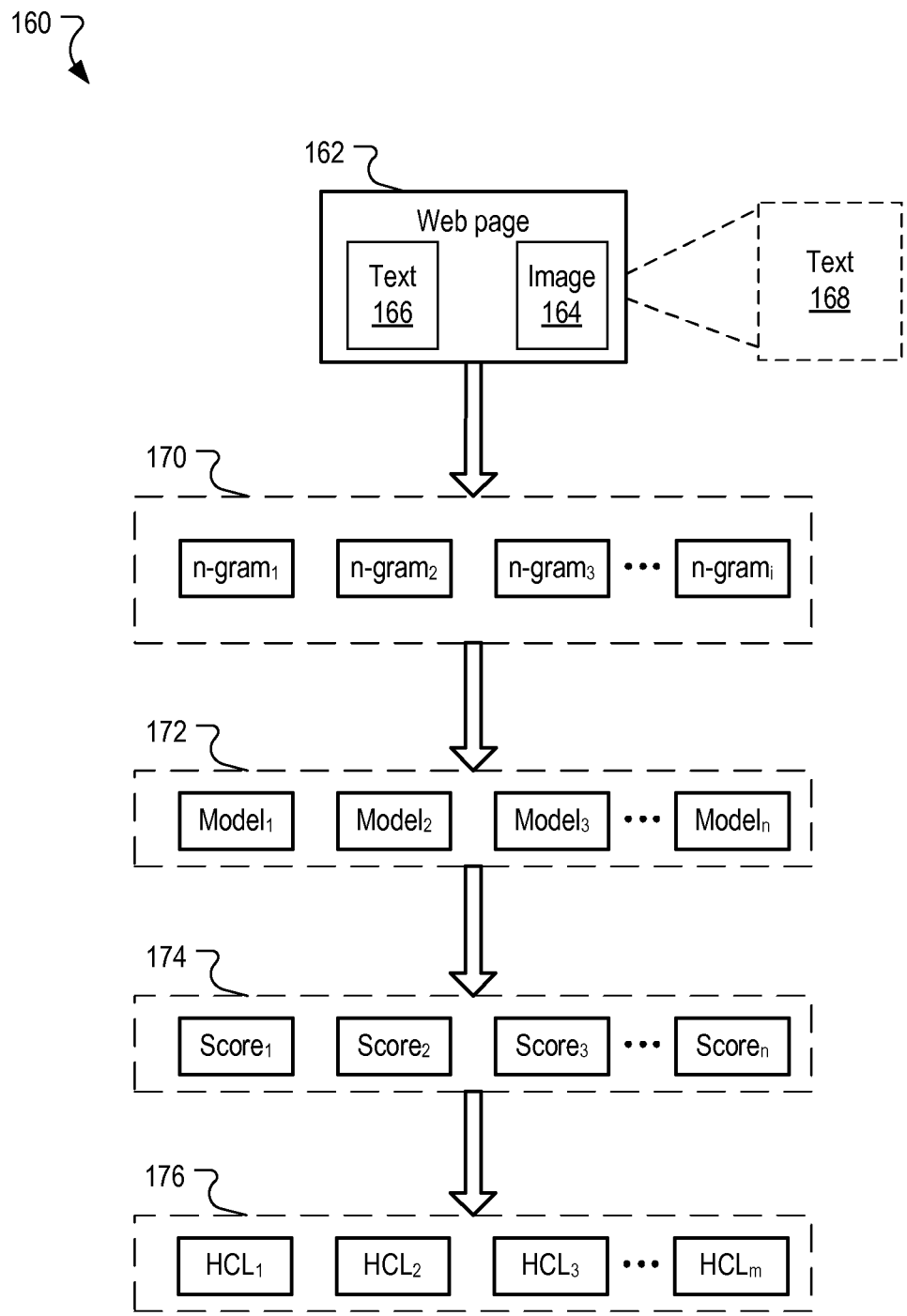
FIG. 1C is a block diagram of an example process flow for classifying images in an image classification subsystem.

FIG. 1C is a block diagram of an example process flow 160 for classifying images in an image classification subsystem 120. The image classification subsystem 120 identifies a Web page 162 with which an image 164 appears. The feature vector for the image 164 and text associated with the image are obtained, as described below with reference to FIG. 3.

The image classification subsystem 120 identifies text 166 that appears with the image 164 on the Web page 162 as being associated with the image 164. The image classification subsystem 120 can also identify text 168 that does not appear on the Web page 162 as being associated with the image 164. For example, a file name for the image, a uniform resource locator for the image, and other metadata for the image 164 can be identified as text associated with the image 164. The image classification subsystem 120 parses the identified text into n-grams (e.g., 1-grams or 2-grams) and defines a set of n-grams 170 for the image 164. Each n-gram is a unique combination of n terms of the identified text.

The image classification subsystem 120 searches a hash map or an index of models that are available for classifying images to determine whether a model is trained for textual units (e.g., queries) matching each of the n-grams in the set of n-grams 170. The image classification system 120 obtains a set of image classification models 172 including each of the image classification models that has been trained for the set of n-grams 170. In turn, the image classification subsystem 120 provides the feature vector for the image 164 as an input to each model in the set of models 172 and receives scores 174 indicating whether the image is a positive image or a negative image for each of the n-grams.

N-grams for which the image is a positive image are identified as a high confidence labels for the image. The high confidence labels $HCL_1$-$HCL_m$ define a set of high confidence labels 176 that the image classification subsystem 120 associates with the image 164. One way in which the image classification subsystem 120 can associate the high confidence labels 176 with the image is to store or index the high confidence labels at memory locations corresponding to the image in a data store, such as the indexed cache 112 of FIG. 1A. The set of high confidence labels 176 can be provided to or accessed by a search system to identify images having labels that match the query.

Figure 2:
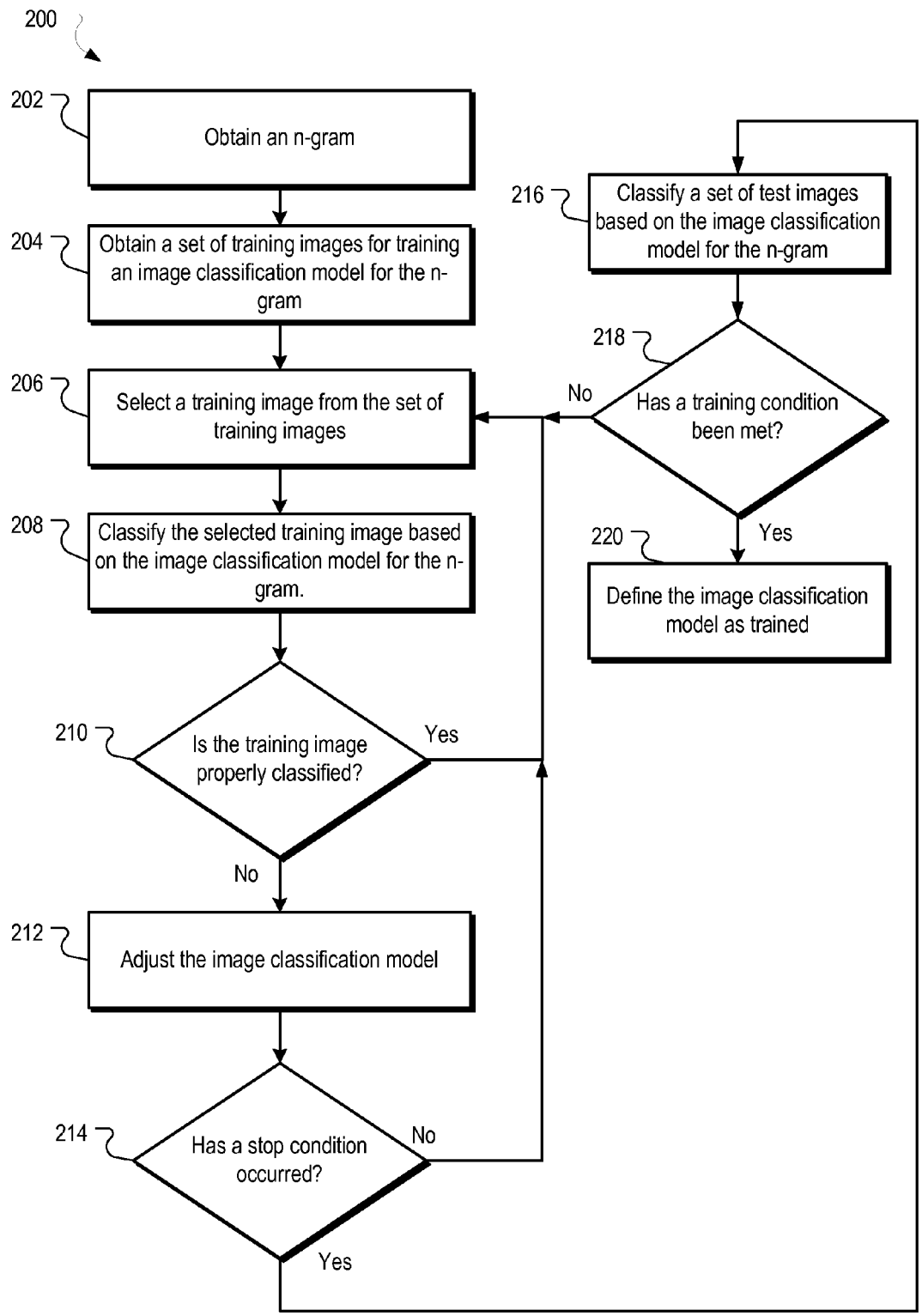
FIG. 2 is a flow chart of an example process for training an image classification model.

FIG. 2 is a flow chart of an example process 200 for training an image classification model. The process 200 is an iterative process by which an image classification model for an n-gram classifies a training image and adjusts the image classification model based on a feature vector for incorrectly classified training images. Additional training images are classified by the adjusted image classification model and the image classification model is further adjusted until a stop condition occurs. Once the stop condition occurs, the image classification model is tested on a set of test images. When a classification error rate for the test images is less than a training threshold, the model is defined as trained and can be used to classify images relative to text matching the n-gram. When the classification error rate meets or exceeds the training threshold, the iterative training process continues until the stop condition occurs again.

To simplify the description, the process 200 is described below with reference to training one particular image classification model for a corresponding query. The query can be identified, for example, by analyzing text associated with a Web page and deriving queries based on the text, or by obtaining search queries that were previously submitted by users through user devices. The queries are referred to as n-grams of text.

As described above, an independent image classification model can be trained for each n-gram in a set of n-grams. Therefore, in some implementations, independent image classification models are trained in parallel for multiple unique n-grams. Thus, multiple instances of the process 200 can be performed simultaneously.

The process 200 can be implemented for example, by the image classification subsystem 120. In some implementations, the image classification subsystem 120 includes one or more processors that are configured to perform the actions of the process 200. In other implementations, a computer readable medium can include instructions that when executed by a computer cause the computer to perform the actions of the process 200.

An n-gram is obtained (202). In some implementations, n-grams include a unique set of one or more terms. For example, one particular n-gram can include the single term "football," while another n-gram can include the two terms "football stadium." Each of these n-grams is a unique set of one or more terms because the two term n-gram includes a word that is not included in the single term n-gram.

In some implementations, a set of n-grams from which the n-gram is obtained can include user queries that have previously been submitted by users. For example, user queries can be obtained from a data store, such as the historical data store 114 of FIG. 1A, that stores user queries. The user queries are analyzed to identify user queries that include unique textual units, as described above. Each user query that includes a unique textual unit is identified as an n-gram in the set of n-grams.

A set of training images for training an image classification model are obtained (204). In some implementations, the set of training images are obtained to train an image classification model for the obtained n-gram. In these implementations, the training images include positive images for the obtained n-gram and negative images for the obtained n-gram. As described above the positive images have relevance measures to the obtained n-gram that satisfy (i.e., meet or exceed) a relevance threshold while the negative images have relevance measures to the obtained n-gram that do not satisfy (i.e., meet or exceed) the relevance threshold.

In some implementations, the relevance measures for the training images are based on relevance feedback for the images relative to the obtained n-gram. For example, selection rates or a function of the selection rates for images referenced in search results responsive to the obtained n-gram can be used as relevance measures the images. The relevance measures for the images can be represented by a relevance score. The relevance score for each image is compared to the relevance threshold. Images having relevance scores that meet or exceed the relevance threshold are defined as positive images for the obtained n-gram. Images having relevance measures that do not meet or exceed the relevance threshold are negative images for the obtained n-gram.

In some implementations, the relevance measures for the training images can be based on other forms of relevance feedback for images relative to the obtained n-gram. For example, the relevance measures can be based on labels that are explicitly associated with images by users. Images that are explicitly associated with a particular label at least a threshold number of times can be identified as positive images for the label. Similarly, images that are explicitly associated with a particular label at least a threshold portion of the total number of times that the image has been associated with any label can be identified as a positive image for the label.

A training image is selected from the set of training images (206). In some implementations, the training image is semi-randomly selected from the set of training images. For example, each of the images can be associated with a unique numeric identifier and a semi-random number generator can be used to select one of the unique numeric identifiers. In turn, the training image associated with the selected unique numeric identifier can be selected from the set of training images.

In some implementations, the semi-random selection of training images can be subject to a selection requirement that specifies a likelihood that a negative and/or a positive image is selected from the set of training images. For example, the selection requirement can specify that a negative image be selected with a probability of 0.75, while a positive image is selected with a probability of 0.25. Thus, the semi-random number generator can select a negative image from the set of training images in 75% of all selections, while selecting a positive image the remaining 25% of the time.

The selected training image is classified with the image classification model for the n-gram (208). In some implementations, the selected training image is classified based on a classification score for the image, for the n-gram, that is computed by the image classification model. The classification score is a measure of relevance for the image to the n-gram that is computed based on the feature vector for the image. When the classification score meets or exceeds a classification threshold, the image is classified as relevant to the n-gram. Otherwise, the image is classified as not relevant to the n-gram.

The feature vector for an image is based on image feature values of the image. The image feature values represent visual features of one or more aspects of the image. Example image feature values for an image include values representing color, texture, edges and other characteristics of the image.

The image feature values can be extracted, for example, from the images during the crawling that is performed by the search system 110. Example processes for extracting values of image feature values include processes for generating color histograms, texture detection processes (e.g., based on spatial variation in pixel intensities), scale-invariant feature transform, edge detection, corner detection and geometric blur.

In some implementations, the image feature values for an image are detected at two or more image scales. For example, image feature values can be identified for a full resolution version of an image (e.g., 100% of native pixels) and for a higher and/or lower resolution version of the image by up-sampling and/or down-sampling the image. Identifying image feature values for images at various resolution levels can facilitate identification of relationships between images and text even when the images are provided with different resolution characteristics.

The image feature values are extracted, for example, from each of a plurality of overlapping square portions of each image. Edge histograms are based on differences in intensities of circular portions of the image that are centered at each pixel, referred to as a center pixel, of the square portions. For each circular portion, an intensity of the center pixel is compared to interpolated intensities of pixels that are located at eight equally spaced locations on an outer edge of the circular portion. Each of the pixels is determined to have a lower or greater intensity than the center pixel, and is assigned a respective 0 or 1 binary value based on the determination.

The eight binary values provide an eight-bit sequence that represents the texture of the circular portion. This eight-bit binary sequence can be represented as a 256-bin histogram. However, the bins corresponding to non-uniform sequences (i.e., sequences having more than two 1 to 0 or 0 to 1 transitions) can be merged, thereby allowing each of the 256 bin histograms to be mapped to 59 bin histograms.

Color histograms for each pixel are generated based on k-means clustering. A color codebook is learned from red-green-blue pixels of sample images, for example, using machine learning processes. A color histogram for a square portion of the image is determined by mapping each pixel in the square portion to the color of the color codebook to which the pixel most closely corresponds.

In some implementations, the image feature values of images can be indexed based on a frequency with which the image feature values occur in various scaled versions of the image. Indexing the image feature values without a reference to the spatial relation of the image feature values in the image results in a "bag of image feature values" for the image.

The bag of image feature values for the image includes a frequency of image feature values that satisfy each feature category without considering where each of the image feature values occurs in image. Therefore, each image is characterized by frequency distribution of the image feature values for the image. Indexing image feature values of images as "a bag of image feature values" facilitates characterization of an image irrespective of the image scale.

In some implementations, the image feature values can be mapped to a discrete index of visual terms to represent the image feature values as a sparse vector. The visual terms represent sets of image feature values that may vary, but still represent similar visual features. For example, concatenated color and texture vectors having similar image feature values can be mapped to the same visual term even though variations may exist in the illumination or color of from which image feature values are identified. The mapping of concatenated feature vectors to visual terms can be learned, for example, according to relationship (1)

$$p_i = \frac{f_i * idf_i}{\sqrt{\sum_{j=1}^{|C|}(f_j * idf_j)^2}} \quad (1)$$

Where, $p_i$ is the weight of the visual term i in the an image p;
$f_i$ is the frequency of the visual term i in the image p;
$f_j$ is the frequency of the visual term j in the image p;
$idf_i$ is the inverse document frequency of visual term i, defined as $-\log(r_i)$, where $r_i$ is a fraction of training images containing at least one occurrence of visual term i;
$idf_j$ is the inverse document frequency of visual term j, defined as $-\log(r_j)$, where $r_j$ is a fraction of training images containing at least one occurrence of visual term j; and
|C| is the set of visual terms.

Relationship (1) provides visual term weights that normalize the sparse vector that results from mapping each the concatenated vectors for an image to visual terms. The normalization emphasizes concatenated vector values that correspond to rare visual terms (i.e., visual terms that appear in less than a threshold portion of all images) and de-emphasizes concatenated vector values that correspond to common visual terms (i.e., visual terms that appear in more than a threshold portion of all images). Thus, according to relationship (1), the less frequent a visual term appears in a corpus of images, the more informative the visual term is, and in turn, the higher the weight that the visual term receives.

The visual terms for each of the images can be indexed without reference to the spatial relation of the image feature values in the image. Indexing the visual terms without a reference to the spatial relation of the visual terms in the image results in a "bag of visual terms" for the image. In turn, the feature vector for the image can be a sparse vector of visual terms that represents a histogram of visual terms for the image.

In some implementations, the images can be represented by a feature vector that includes the visual terms to which the image feature values were mapped as well as the k-nearest neighbor visual terms. For example, the bag of visual terms for an image can be provided as an input to a kd-tree acceleration structure or a spill-tree algorithm to identify the k-nearest visual terms for each of the visual terms in the bag of visual terms. Including the k-nearest visual terms in the feature makes the sparse vector of visual terms more dense, but the resulting feature vector is generally still less dense than feature vectors that include each of the image feature values identified for the image.

The feature vector for the training image is provided as an input to the image classification model to generate a classification score by which the image can be classified. The image classification model computes the classification score for the image based on a result of a function of the feature vector. In some implementations, the function by which the classification score is computed is represented by relationship (2).

$$\text{Score} = \Sigma_1{}^i \alpha_i \cdot \text{Min\_Kernel}(x_i, x) + b \quad (2)$$

Where,

Score is the classification score for the image;
i represents a set of i iterations in which a training image is incorrectly classified;
$x_i$ is a support vector for the $i^{th}$ iteration;
$\alpha_i$ is a scalar corresponding to the support vector $x_i$;
b is a bias term to normalize classification scores to the classification threshold;
Min_Kernel ($x_i$, x)=is a minimum kernel represented by a sum of a minimum of each dimension of $x_i$ and x, respectively and represented by relationship (3)

$$\text{Min\_Kernel}(x_i, x) = \Sigma_j(\min((x_i(j), x(j)))$$

Where, x(j) is the $j^{th}$ term of the training image feature vector; and
$x_i(j)$ is the $j^{th}$ term of the support vector for the $i^{th}$ iteration.

In some implementations, the image search subsystem 120 initializes the set of scalars $\alpha_i$ to default values to begin the training process. For example, prior to classifying the first training image, each scalar $\alpha_i$ can be set to "0." Similarly, the set of support vectors $x_0$ can be empty. Thus, a classification score for the first selected training image can be based solely on the bias term b. Subsequent classification scores for subsequently selected training images are computed based on the scalars $\alpha_i$ that have been computed based on prior training image classifications and the support vectors $x_i$ that have been identified based on the prior training image classifications, as described below.

The classification score for the training image is compared to the relevance threshold to determine whether the image is classified as a positive image for the n-gram or a negative image for the n-gram. Positive images for the n-gram are images having classification scores that meet or exceed the relevance threshold, while image having classification scores that are lower than the relevance threshold are classified as negative images for the n-gram.

A determination is made whether the training image is correctly classified (210). In some implementations, the classification score based classification of the training image is compared to the original classification of the training image. If the classification score based classification matches the original classification the image is correctly classified by the image classification model, and another training image is selected (204).

When the classification score based classification does not match the original classification, the training image is incorrectly classified, and the image classification model is adjusted based on the feature vector of the training image (212). In some implementations, the feature vector of the training image is used to define a support vector for the model. The support vector can match the feature vector for the training image or otherwise be based on the feature vector. The support vector is added to the model and used to compute the scalars $\alpha_i$ for the image classification model.

In some implementations, the image classification model is a passive-aggressive model for image retrieval ("PAMIR"). One example of a PAMIR is described in "A Discriminative Kernel-based Model to Rank Images from Text Queries" David Grangier, Samy Bengio, IEEE Transactions on Pattern Analysis and Machine Intelligence, vol. 30 (2208), pp. 1371-1384, which is incorporated herein by reference in its entirety. Other passive aggressive learning processes can be used.

PAMIR is a linear model that can be applied to infer non-linear decisions. The linear model is trained by iteratively computing classification scores for the training images and adjusting values of the model based on the feature vectors (i.e., support vectors) of images that are incorrectly classified from the computed classification scores. For example, each support vector $x_i$ can be added to the model and a corresponding scalar $\alpha_i$ can be computed so that the classification score for the incorrectly classified training image is closer to a value at which the training image will be correctly classified.

In some implementations, a scalars $\alpha_i$ is computed for each support vector $x_i$ such that the each scalar is proportional to a minimum between a specified aggressiveness constant (i.e., a constant that controls a tradeoff between minimizing expected error of future iterations and maintaining low model values) and a ratio of a loss for the training images and one plus the squared norm of the feature vector for the training image. The loss for a training image is a measure of the error between the classification score for the training image is represented by relationship (4)

$$Loss_i = (1-CS)*Score_i$$

Where,

Loss$_i$ is the loss for the $i^{th}$ iteration;

CS$_i$ is a value representing the correct classification of the $i^{th}$ training image (e.g., +1 for a positive training image and −1 for a negative training image); and Score$_i$ is the classification score for the $i^{th}$ training image.

In some implementations, the Min_Kernel of the image classification model is approximated after each iteration in which a support vector is defined. Approximating the Min_Kernel following each iteration in which a support vector is defined increases the speed with which the image classification model is trained because the errors from each iteration are condensed into the current approximation. Thus, only the most current support vector need be retained, rather than every identified support vector.

One example Min_Kernel approximation technique is described in "Classification using Intersection Kernel Support Vector Machines is Efficient," Subhransu Maji, Alexander Berg, Jitendra Malik, IEEE Computer Vision and Pattern Recognition (2008), which is incorporated herein by reference. However, other approximations in which the order of summation (i.e., inner loop) is interchangeable can be used.

Once the image classification model has been adjusted, a determination is made whether a stop condition has occurred (214). The stop condition specifies when the iterative training of the model is to stop and testing of the model is to begin. The stop condition can occur, for example, when at least a minimum number of training iterations have occurred. When the stop condition has not occurred, another training image is selected (204).

When the stop condition has occurred, a set of test images are classified with the image classification model (216). In some implementations, the set of test images include positive images and negative images for the n-gram that were not included in the set of training images. The test images included in the set of test images can be identified in a manner similar to that described above for identifying the training images.

The set of test images are classified by the image classification model based on feature vectors of the test images. The feature vectors for the test images are iteratively input to the image classification model and test results corresponding to each of the test images is output from the image classification model.

In some implementations, the test result for each image is the classification score for the image to the n-gram according to the image classification model. The classification score is analyzed to determine whether the image is classified as a positive image for the n-gram or a negative image for the n-gram and each test image is classified based on the analysis, as described above.

Once the set of test images has been classified, a determination is made whether the image classification model meets a training condition (218). In some implementations, the training condition specifies a maximum error rate for a trained model. For example, the training condition can specify that a trained model has a classification error rate of less than 5%. Thus, when less than 5% of the test images are incorrectly classified based on the classification score computed by the image classification model, the model is defined as trained. In contrast, when 5% or more of the test images are incorrectly classified based on the classification score, the model continues to be trained.

In other implementations, the training condition specifies that an image classification model be trained when the classification error rate for the model converges to a value. For example, the training condition can specify that when the change in error rate for the image classification model changes less than a specified amount relative to the error rate for one or more previous iterations of testing, the image classification model is defined as trained. In these implementations, the change in error rate relative to the error rate for the one or more previous iterations is compared to the specified change in error rate. When the change in error rate for the image classification model exceeds the specified amount, the training condition has not been met. When the change in error rate is less than the specified amount, the training condition has been met.

When the image classification model does not meet the training condition, the image classification model requires additional training Therefore, another training image selected from the set of training images (204) for training the image classification model, as described above.

Once the final training image has been selected, classification scores for the set of test images are computed. These classification scores can be used to compute a measure of confidence for the image classification model. The measure of confidence can be based, for example, on a portion of the test images that are correctly classified, a measure of error between the classification scores and the correct classifications of images or other error indicators. The scores on the test set can also be used to select a per-model confidence threshold in order to balance precision and recall. The precision is a measure of accuracy that is based on the number of correctly classified positive (or negative) images relative to the number of images that were classified as a positive (or negative) image. The recall is an another accuracy measure based on a number of correctly classified positive (or negative) images relative to a total number of positive (or negative) images.

When the image classification model meets the training condition, the image classification model is defined as trained (220) for the n-gram and the process 200 ends. The trained image classification model can be used to classify images relative to the n-gram.

Figure 3:
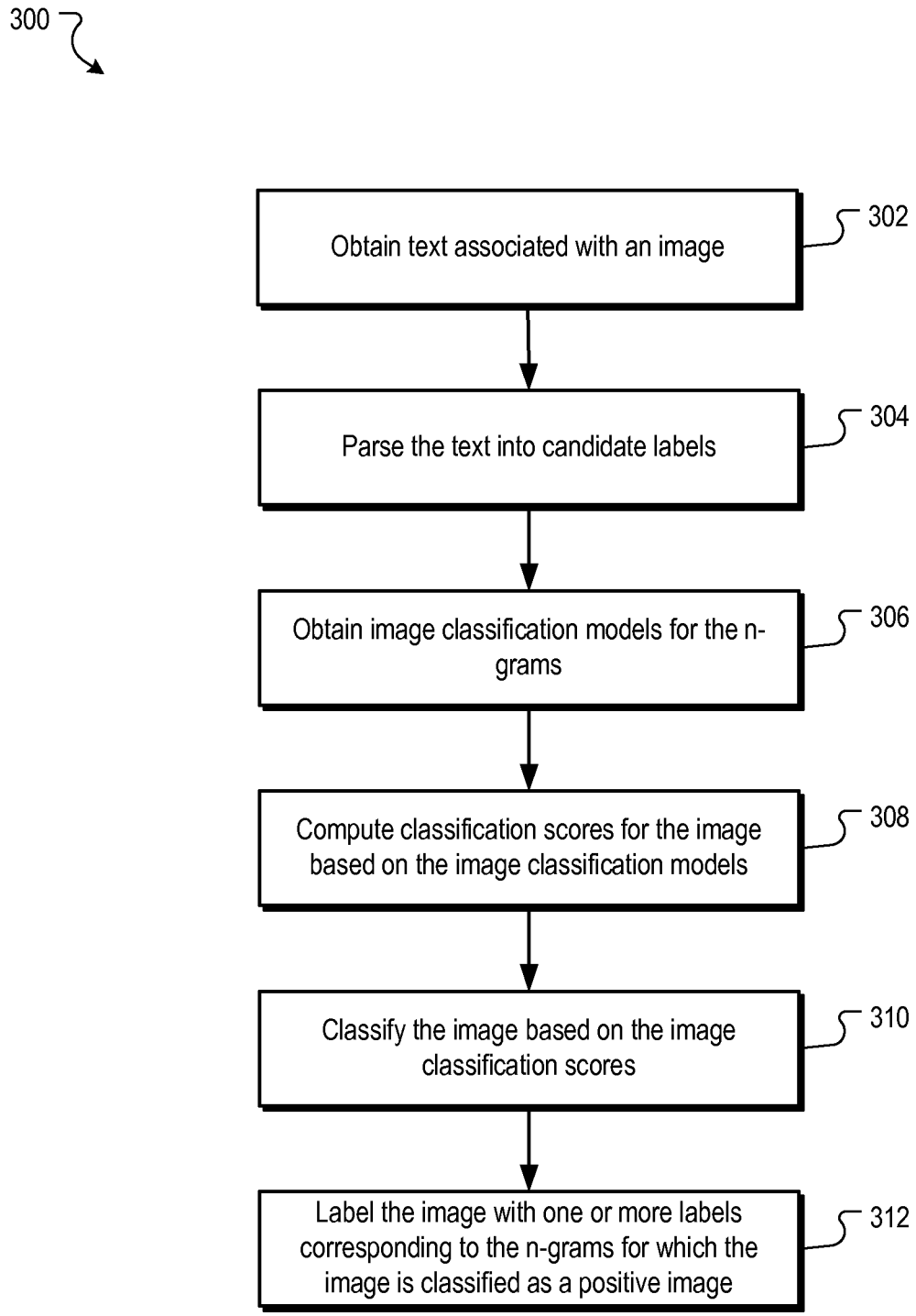
FIG. 3 is a flow chart of an example process for classifying images relative to text.

FIG. 3 is a flow chart of an example process 300 for classifying images relative to text. In some implementations, an image is classified relative to n-grams defining candidate labels that are identified from text that is associated with the image. As described above, the text associated with the image can be text that appears on a Web page with the image or text that is otherwise associated with the image (e.g., a file name or anchor text on other Web pages that link to the image).

The text associated with the image is parsed into one or more unique candidate labels. For each of the unique candidate labels for which an image classification model has been trained, the corresponding image classification model is obtained. The image is classified according to each of the image classification models and labels corresponding to the candidate labels for which the image is a positive image are associated with the image.

The process 300 can be implemented, for example, by the image classification subsystem 120 of FIG. 1A. In some implementations, the image classification subsystem 120 includes one or more processors that are configured to perform operations of the process 300. In other implementations, a computer readable medium can include instructions that when executed by a computer cause the computer to perform operations of the process 300.

Text associated with an image is obtained (302). In some implementations, the text is text that appears on a Web page with the image. For example, text that appears within a threshold number of pixels of the image can be identified as potentially relevant to the image and obtained. Alternatively, all text that appears on the Web page with the image can be obtained for analysis.

Text that does not appear on the Web page with the image can also be potentially relevant to the image and, therefore, obtained. For example, a URL specifying a network location of the image may include relevant text for the image. Similarly, labels that have been associated with the image can be obtained to determine whether the labels accurately describe the image. Further, text (e.g., anchor text for links) that appears on other Web pages including links to the image can be obtained to determine the relevance of the text to the image.

In some implementations, the text can be obtained from a data store in which the text associated with the image is stored. For example, text associated with an image can be obtained from the indexed cache 112 of FIG. 1A.

The text is parsed into candidate labels (304). In some implementations, the text is parsed by segmenting the text into unique n-grams of differing sizes that define each of the candidate labels. For example, the text "this is Hector's birthday cake" can be parsed into five unigrams, ten bigrams, ten 3-grams, four 4-grams, and one 5-gram. Each n-gram includes a unique set of words and is a candidate label for the image. In some implementations, two candidate labels can be unique candidate labels even when the same words appear in a different order. For example, the n-gram "cake knife" can be a unique candidate label relative to the candidate label "knife cake." In some implementations, the n-gram must include n consecutive words rather than any n unique words. Additionally, a bigram can be concatenated into a unigram when doing so results in a valid unigram. For example, the bigram "hot dog" can be concatenated to form the unigram "hotdog."

In some implementations, common terms can be filtered from the text so that each candidate label only includes less common terms. A common term can be defined as a term that is associated with a threshold number or portion of images. For example, terms that are identified as being associated with one million different images can be defined as common terms and, therefore, filtered from the text. Similarly, terms that are associated with at least a threshold portion of identified image can be filtered from the text. For example, terms that are associated with more than 30% of a sample of images can be filtered from the text. Common terms can also include, for example, a predefined list of "stop words" (i.e., words specified as having low significance for identifying relevant search results). Filtering common terms from the text can facilitate identification of relevant terms for an image that are relevant for fewer other images than the common terms.

Once the text is parsed, image classification models are obtained for the candidate labels (306). In some implementations, a determination is first made that an image classification model has been trained for a textual unit matching the candidate label. A textual unit can match the candidate label, for example, by being the same as the candidate label or optionally by having at least a threshold similarity to the candidate label. The threshold similarity can be specified by a minimum number or portion of the same words in both the textual unit and the candidate label. Similarly, the threshold similarity can be specified by a threshold portion of the textual unit and the candidate label matching. The threshold similarity can also be specified based on linguistic similarities existing between the textual unit and the candidate label.

In some implementations, the determination that an image classification model has been trained for a textual unit matching the candidate label by searching a hash map or an index of models that have been trained for candidate labels. Once it is determined that an image classification model is trained for a candidate label, the image classification model can be accessed and used from its location or retrieved from its location for use.

Classification scores are computed for the image based on the image classification models (308). In some implementations, a classification score for the image relative to a candidate label is generated based on the feature vector for the image and according to the image classification model for the candidate label. The feature vector for the image can be obtained in a manner similar to that described for obtaining feature vectors of training images with reference to FIG. 2. The feature vector is input to the image classification model and the classification score, for example, according to equation (2) is the output. An independent classification score is generated for the image relative to each candidate label for which a trained image classification model was identified.

The image is classified based on the classification scores (310). The image is classified as a positive image for a candidate label when the classification score meets or exceeds the classification threshold. The image is classified as a negative image for the text when the classification score is less than the classification threshold.

The image is associated with labels corresponding to one or more of the candidate labels for which the image is classified as a positive image (312). In some implementations, the label is text that matches the candidate label and is associated with the image by storing the text at a memory location corresponding to the image. In other implementations, the label is a data flag indicating that the image is associated with a specified topic.

In some implementations, the labels are considered high confidence labels indicating that the labels have a minimum specified relevance to the image. High confidence labels can be used, for example, by a search system to adjust relevance scores for images identified in response to a search query. For example, the search system can adjust a relevance score for an image that is associated with a high confidence label matching the search query relative to the relevance score for an image with a label that is not a high confidence label. In some implementations, the relevance score for an image is adjusted based on a boost factor.

Figure 4:
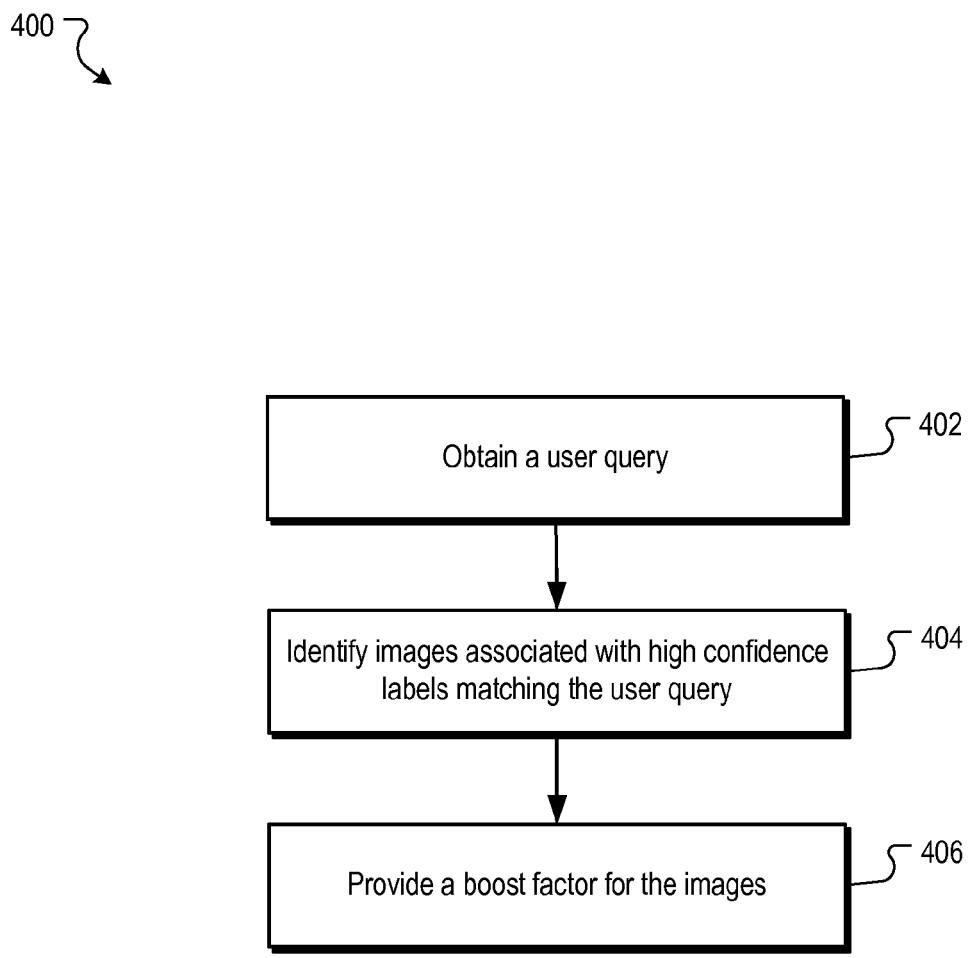
FIG. 4 is an example process for providing a boost factor for adjusting a relevance score of an image.

FIG. 4 is an example process 400 for providing a boost factor for adjusting a relevance score of an image. In some implementations, the boost factor provided for images that are associated with high confidence labels that match a user query. The process 400 can be implemented, for example, by the image classification subsystem 120 of FIG. 1A. In some implementations, the image classification subsystem 120 includes one or more processors that are configured to perform operations of the process 400. In other implementations, a computer readable medium can include instructions that when executed by a computer cause the computer to perform operations of the process 400.

A user query is obtained (402). In some implementations, the user query is one or more words that define a topic for which search results are requested. The user query can be obtained, for example, from a search system or a data store storing user queries that are being processed by a search system.

Images associated with high confidence labels matching the user query are identified (404). The high confidence labels are labels that have a high confidence of being relevant for an image based on a classification score of the image to the label, as described above. In some implementations, high confidence labels that match the user query are high confidence labels that are the same as the user query. In other implementations, high confidence labels that match the user query also include high confidence labels that are specified as matching the user query based on the high confidence label having a threshold similarity to the user query, as described with reference FIG. 3.

A boost factor is provided for the identified images (406). In some implementations, the boost factor can be a common value (e.g., 1.2) that is provided for each identified image that is associated with a high confidence label. In other implementations, the boost factor varies based on a strength of the match between the user query and the high confidence label. For example, images that are associated with high confidence labels that are the same as the user query can be provided a higher boost factor than images that are associated with high confidence labels that match the user query, but are not the same as the user query. In some implementations, the boost factor is provided to a search system to adjust relevance scores of images relative to the user query. In other implementations, the boost factor is applied to relevance scores for the identified images and the adjusted relevance scores are provided to the search system.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method, comprising:
    obtaining a user query;
    identifying, by one or more computers, images that have been assigned, by one or more image classification models for one or more corresponding n-grams that each match the user query, the n-gram as a text label of the image, wherein the image classification models assign n-grams as labels to images based on the images being associated with text matching the corresponding n-gram of the image classification model and a feature vector of the image;
    applying, by one or more computers, a boost value to a relevance score of each of at least one of the images to obtain an adjusted relevance score, wherein the boost value applied is based, at least in part, on a strength of the match between the user query and the text label of the image;
    ranking, by one or more computers, the images based, at least in part, on the adjusted relevance score; and
    outputting, by one or more computers, at least a portion of the images for presentation on a search results page responsive to the user query.

2. The method of claim 1, further comprising assigning a magnitude to the boost value based on a strength of the match between the user query and the text label, wherein the magnitude of the boost value is proportional to the strength of the match.

3. The method of claim 2, wherein assigning a magnitude to the boost value comprises assigning a highest magnitude to the boost value when the user query exactly matches the text label.

4. The method of claim 1, further comprising training the classification model.

5. The method of claim 4, wherein training the classification model comprises training the classification model based on feature vectors of positive training images having relevance measures, for the n-grams, that satisfy a relevance threshold and negative training images having relevance measures, for the n-grams, that do not satisfy the relevance threshold.

6. The method of claim 5, wherein training the image classification model comprises:
    for each of one or more training images from the positive training images or the negative training images:
        computing a classification score for the training image based on an initial image classification model;
        classifying the training image based on the classification score;
        determining that the training image is incorrectly classified; and
        computing a minimum kernel approximation based on the feature vector for the training image to adjust the initial image classification model.

7. The method of claim 5, further comprising assigning an image a label based on a feature vector for the image and the image classification model for an n-gram matching the label.

8. A system comprising:
    a data store storing images; and
    one or more computers that interact with the data store and execute instructions that cause the one more computers to perform operations comprising:
        obtaining a user query;
        identifying images that have been assigned, by one or more image classification models for one or more corresponding n-grams that each match the user query, the n-gram as a text label of the image, wherein the image classification models assign n-grams as labels to images based on the images being associated with text matching the corresponding n-gram of the image classification model and a feature vector of the image;
        applying a boost value to a relevance score of each of at least one of the images to obtain an adjusted relevance score, wherein the boost value applied is based, at least in part, on a strength of the match between the user query and the text label of the image;
        ranking the images based, at least in part, on the adjusted relevance score; and
        outputting at least a portion of the images for presentation on a search results page responsive to the user query.

9. The system of claim 8, wherein the instructions cause the one more computers to perform operations further comprising assigning a magnitude to the boost value based on a strength of the match between the user query and the text label, wherein the magnitude of the boost value is proportional to the strength of the match.

10. The system of claim 9, wherein assigning a magnitude to the boost value comprises assigning a highest magnitude to the boost value when the user query exactly matches the text label.

11. The system of claim 8, wherein the instructions cause the one more computers to perform operations further comprising training the classification model.

12. The method of claim 11, wherein training the classification model comprises training the classification model based on feature vectors of positive training images having relevance measures, for the n-grams, that satisfy a relevance threshold and negative training images having relevance measures, for the n-grams, that do not satisfy the relevance threshold.

13. The system of claim 12, wherein training the image classification model comprises:
for each of one or more training images from the positive training images or the negative training images:
computing a classification score for the training image based on an initial image classification model;
classifying the training image based on the classification score;
determining that the training image is incorrectly classified; and
computing a minimum kernel approximation based on the feature vector for the training image to adjust the initial image classification model.

14. The system of claim 12, wherein the instructions cause the one more computers to perform operations further comprising assigning an image a label based on a feature vector for the image and the image classification model for an n-gram matching the label.

15. A non-transitory computer readable medium encoded with a computer program comprising instructions that when executed cause one or more computers to perform operations comprising:
obtaining a user query;
identifying images that have been assigned, by one or more image classification models for one or more corresponding n-grams that each match the user query, the n-gram as a text label of the image, wherein the image classification models assign n-grams as labels to images based on the images being associated with text matching the corresponding n-gram of the image classification model and a feature vector of the image;
applying a boost value to a relevance score of each of at least one of the images to obtain an adjusted relevance score, wherein the boost value applied is based, at least in part, on a strength of the match between the user query and the text label of the image;
ranking the images based, at least in part, on the adjusted relevance score; and
outputting at least a portion of the images for presentation on a search results page responsive to the user query.

16. The computer readable medium of claim 15, wherein the instructions cause the one more computers to perform operations further comprising assigning a magnitude to the boost value based on a strength of the match between the user query and the text label, wherein the magnitude of the boost value is proportional to the strength of the match.

17. The computer readable medium of claim 16, wherein assigning a magnitude to the boost value comprises assigning a highest magnitude to the boost value when the user query exactly matches the text label.

18. The computer readable medium of claim 15, wherein the instructions cause the one more computers to perform operations further comprising training the classification model.

19. The computer readable medium of claim 18, wherein training the classification model comprises training the classification model based on feature vectors of positive training images having relevance measures, for the n-grams, that satisfy a relevance threshold and negative training images having relevance measures, for the n-grams, that do not satisfy the relevance threshold.

20. The computer readable medium of claim 19, wherein training the image classification model comprises:
for each of one or more training images from the positive training images or the negative training images:
computing a classification score for the training image based on an initial image classification model;
classifying the training image based on the classification score;
determining that the training image is incorrectly classified; and
computing a minimum kernel approximation based on the feature vector for the training image to adjust the initial image classification model.

* * * * *